Feb. 28, 1928.
E. R. KNIGHT
1,661,135
METHOD OF MANUFACTURING DYNAMO ELECTRIC MACHINES
Original Filed April 17, 1922
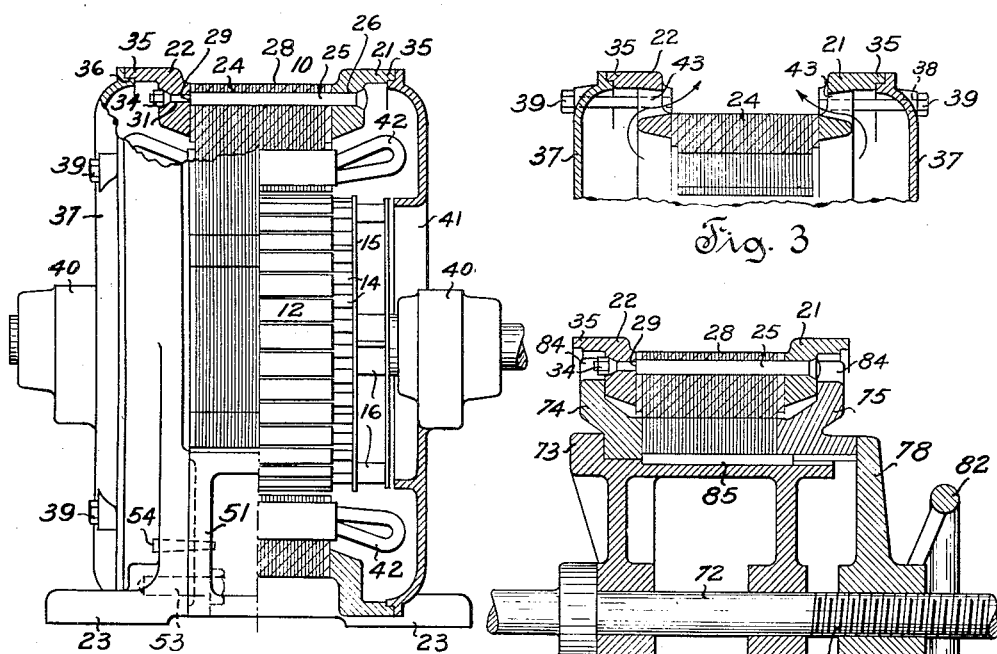
Fig. 1
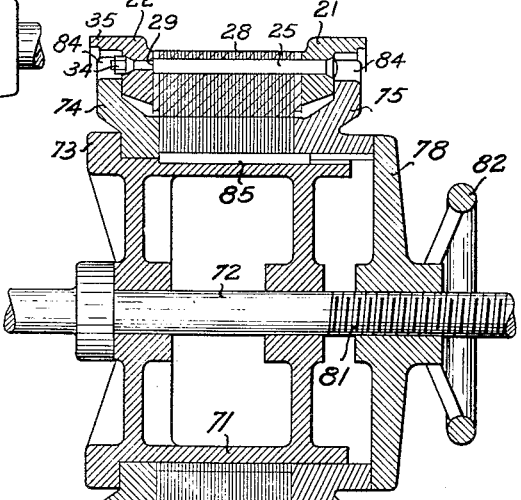
Fig. 3
Fig. 4
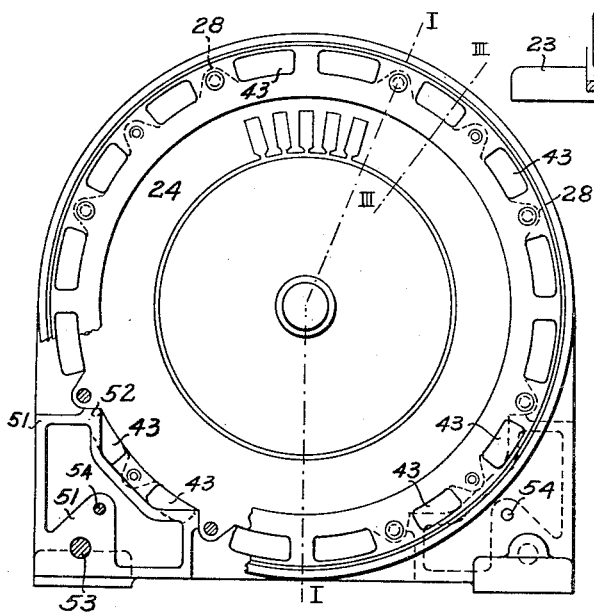
Fig. 2
Fig. 5
Inventor
E. R. Knight
by
Attorney Patented Feb. 28, 1928.

1,661,135

UNITED STATES PATENT OFFICE.

EARLE R. KNIGHT, OF NORWOOD, OHIO, ASSIGNOR TO ALLIS-CHALMERS MANUFACTURING COMPANY, OF MILWAUKEE, WISCONSIN, A CORPORATION OF DELAWARE.

METHOD OF MANUFACTURING DYNAMO-ELECTRIC MACHINES.

Original application filed April 17, 1922, Serial No. 553,912. Divided and this application filed April 6, 1925. Serial No. 20,935.

This invention relates in general to dynamo-electric machine construction, and it has particular relation to the construction of the stator element of machines of this type, wherein a laminated core is held in assembled condition between end heads or plates without the necessity of the ordinary yoke surrounding the laminations.

The yokeless type of stator for dynamo-electric machines, especially for small motor construction, has decided advantages among which are decreased cost, arising especially from elimination of the surrounding yoke. Aside from the resulting decrease in weight, this elimination of the yoke insures flexibility as to the number of sizes or ratings of machines which can be constructed from the same stock parts and the patterns and dies therefor. This reduction in the number of parts and, consequently, the necessary patterns and dies therefor substantially reduces the investment involved in the manufacture and storage of the necessary patterns and dies for these parts, and the manufactured parts themselves.

The present invention includes improvements in the construction of the stator element of dynamo-electric machines, whereby the operations of assembling the machine are simplified, and the final construction is one in which maximum strength is provided; the invention more specifically including improvement in methods of assembling and machining the stator element, whereby there is suitable economy in the matter of actual expense and time involved in such assembling and machining; and it is accordingly an object of this invention to provide an improved method of assembling and constructing elements of dynamo-electric machines of the laminated core type.

These and other objects and advantages are attained by this invention, the various novel features of which will be apparent from the description and drawings, disclosing an embodiment of the invention, and will be more particularly pointed out in the claims.

In the accompanying drawings:

Fig. 1 is a front elevation, partly in section, of a dynamo-electric machine embodying features of the present invention, the plane of section of the right-hand half of the machine being that of the line I—I of Fig. 2.

Fig. 2 is a right-hand end elevation of the machine shown in Fig. 1, with the end bell removed and certain parts broken away, as indicated, and the stator winding being omitted and the rotor shown only in conventional outline.

Fig. 3 is a broken sectional view along the plane of the line III—III of Fig. 2.

Fig. 4 is a vertical sectional view showing certain apparatus through which features of the present invention are utilized in assembling and finishing the stator element of a dynamo-electric machine.

Fig. 5 is an end elevation of the apparatus shown in Fig. 4, with parts broken away.

The dynamo-electric machine disclosed in the drawings, here shown as an alternating current motor of the squirrel-cage type, includes a stator 10 and a rotor 12 mounted for rotation within the stator. The slots of the rotor core are provided with conducting bars 14 which project beyond the ends of the core and are there secured to end connecting rings 15. A ventilating fan 16 is mounted upon the outer side of each of the end rings 15, the purpose of these fans being to draw currents of ventilating air into the machine in an axial direction and to force these air currents radially outward across the stator winding to cool the same.

The stator 10 comprises a frame consisting essentially of the end heads 21 and 22, preferably of cast steel, and having integral feet 23 for supporting the machine on a base, slide rail, etc. Core laminæ 24 are held in assembled condition between the end heads by means of bolts 25 passing through apertures 26 in the end head 21, each bolt having a shouldered head fitting in a correspondingly shaped counter-bored portion of the aperture 26. These bolts 25 pass through alined apertures in enlargements or lugs 28 at the outer periphery of the core laminations. The other end of each of the bolts 25 may be reduced to form a shoulder, as indicated at 29, which fits against the inner side of the end head 22, the reduced portion of the bolt passing through an aperture 31 in this end head, and the outer end of this aperture being tapered to receive the inner portion of a correspondingly tapered locking or other type of nut 34 threaded on the end of the bolt. The bolts 25 with their cooperating nuts 34 serve to hold the end head 22 drawn up against the shoulders 29 on the bolts 25, the arrangement being such as serve to limit both the mutual approach and separation of the end heads, the bolts thus acting to maintain the end heads parallel and a definite distance apart with the core laminations securely clamped in position.

Each of the end heads 21 and 22 is provided with an axial extension 35 at its outer periphery, the radially inner side of each of these extensions being provided with a shouldered recess 36 which is machined to receive a correspondingly machined portion at the outer periphery of an end bell or housing 37. Each end bell is provided with spaced through apertures 38 near its edge to receive bolts or cap screws 39, here shown as four in number and spaced apart the same distance so as to provide for interchangeable fitting of the end bell in position. These cap screws 39 are threaded into correspondingly spaced and threaded apertures in the end heads 21 and 22, and thus serve to hold the end bell in operative position.

Bearing housings 40 are preferably cast integral with the end bells, apertures 41 being provided through the end bells adjacent the bearing housings and serving to permit the passage of ventilating air currents to the interior of the machine.

The stator 10 is provided with a winding 42 disposed in slots of the core and having its projecting end portions extending well into the end bells and being generally in radial alinement with the fans 16 on the rotor.

Each of the end heads 21 and 22 is provided with a plurality of spaced apertures 43 near its outer periphery and intermediate the enlargements or lugs 28 carrying the holding bolts or rivets 25 and the bolts 39 for holding the end bells in position, these apertures providing communication between the space within the end bell, in the vicinity of the end turns of the winding 42, and the exterior of the core, as indicated in Fig. 3. The construction is such that, in operation, air is drawn axially inward by the fans 16 through the apertures 41 in the end bells, and is blown radially outward around the end turns of the winding 42, the heated air passing outward through the apertures 43. The heated air is discharged across the exterior of the laminations in a direction substantially parallel to the shaft, this method of discharge eliminating the possibility of dust and dirt dropping into the air passages and retarding the ventilation of the machine.

As a further means for holding the end heads parallel and solid, especially at points adjacent the feet on the end heads, and consequently assisting in holding the feet and end heads in alinement, there are provided saddle-shaped bracing and spacing blocks 51 between the lower portions of the end heads, one of these blocks being between each pair of feet. Each block is machined at its sides, machined edges and pads being indicated, so as to have a close fit between correspondingly machined portions at the inner sides of the end heads 21 and 22. The block is preferably hollow or of skeleton construction, so as to provide the required rigidity with a minimum of weight, and it is formed with substantially right-angle shoulders 52 so spaced and machined as to fit snugly between and against adjacent lugs or enlargements 28 at the exterior of the assembled core laminations. Each of these blocks 51 is forced into operative position with its shoulders 52 between and against adjacent core enlargements 28, and is held in such position by means of bolts or cap screws 53, occupying alined apertures in the block and the end heads 21 and 22 and adjustable through the open lower side of the block, and by tapered dowels 54 which are forced into alined apertures in the block and in the end heads. With the blocks held in this position, all the parts of the stator are firmly secured in operative position.

In assembling the stator of the machine, as indicated generally in Figs. 4 and 5, the core laminations are assembled on a mandrel 71, the latter being shown in the form of a cylinder of the desired external diameter mounted on a shaft 72 directly or through spaced supports or spokes. The mandrel is provided at the left hand end with a flange or abutment 73 against which a follower head 74 abuts. The radially outer portion of the follower head 74 is formed for engagement with the outer side of the end head 22, radially within the extension 35; and the inner portion of the follower head may be formed for light engagement with or so as to be free of the end plate or end lamination of the stator core, as indicated. The laminations of the core are assembled on the mandrel, with the end head 22 in position, abutting against the follower head 74; and the laminations are forced into the desired degree of compactness by an axially shiftable follower head 75, of the same general shape as the follower head 74, the required compacting pressure being applied to an axial extension of the follower head 75, through an axially shiftable follower plate 78 provided with an internally threaded hub in screw-threaded relation with a correspondingly threaded portion of the shaft 72, as indicated at 81, and provided with a hand wheel 82, or other suitable power applying means, such as a hydraulic press, for shifting the plate axially and thus causing movement of the follower head 75. As indicated, the peripheral portions of the follower heads 74 and 75 are recessed, as indicated at 84, to permit ready access to the ends of the clamping bolts 25 and also the portions of the end heads which are apertured for reception of the bolts 39 used for securing the end bells in position.

With the follower heads 74 and 75 suitably positioned with respect to the apertured portions of the end heads and the laminæ, and the latter parts suitably alined so that the apertures thereof are in alinement for reception of the bolts 25, this alinement being satisfactorily secured by means of a key or spline 85 on the shaft which cooperates with the walls of a recess at the inner side of each laminæ, the bolts may be inserted to operative position and any additional compacting pressure necessary may be applied through the follower head 75 to force the bolts home so that the heads thereon and the shoulders at the opposite ends thereof are in engagement with the respective end heads. With the laminæ and end heads forced to and thus held in position, the bolts may be secured in operative position by threading thereon the nuts 34 and swaging or riveting over the latter and the ends of the bolts together against the outer side of the end head 22, thus securing the laminæ and end heads in desired position. Likewise, the end heads may be suitably alined and drawn into and held in assembled condition with respect to the core laminations on the mandrel through the bolts 25 alone and the cooperation of the heads and shoulders thereon with the end heads.

With the core still on the mandrel and the core laminæ and end heads thus finally or permanently secured and held in desired operative relation, that is, the same relation or condition in which these parts are when the machine is finished or completed and ready for sale or use, the saddle blocks 51 may be forced into place between the end heads and secured therein by the dowels 54 and the bolts 53.

While the parts are so assembled on the mandrel and with the latter suitably held in a lathe or press, or otherwise suitably supported, the outer ends of the end heads may be suitably turned or machined for reception of corresponding portions of the end bells 37, thus insuring that the stator core will be concentric with the rotor when the latter is mounted in the bearings carried by the end bells. Likewise, the holes in the end heads 21 and 22, for the reception of the attaching screws 39, may be bored and threaded, while the stator is held assembled on the mandrel. It will be apparent that all of the machining required for the stator may thus be performed while the latter is effectively supported or carried by the mandrel 71. When the machining of the stator is completed, the latter may be removed from the mandrel in an obvious manner after release of the hand wheel 82, the follower plate 78 and the follower head 75.

It will be apparent that this method of assembling the several parts of the stator in operative position and completing the machining operations required is extremely simple and greatly facilitates and reduces the cost of assembling and finishing the machine.

The present application is a division of application Serial No. 553,912, filed April 17, 1922.

It should be understood that it is not desired that the invention claimed be limited to the exact details of construction and operations shown and described herein, but that it include any obvious modifications that may occur to persons skilled in the art.

It is claimed and desired to secure by Letters Patent:

1. A method of manufacturing a core of a dynamo-electric machine, which comprises assembling and compacting core laminations and independent rigid end heads on a supporting element, finally securing said compacted laminations in position between said end heads, and removing said assembled laminations and end heads as a unit from said supporting element.

2. A method of manufacturing a core of a dynamo-electric machine, which comprises assembling and compacting core laminations between independent rigid end heads on a supporting element, finally securing said compacted laminations in position between said end heads to form therewith a unitary member, machining a portion of said member while the latter is carried by said supporting element, and removing said member as a unit from said supporting element.

3. A method of manufacturing a core of a dynamo-electric machine, which comprises assembling and compacting core laminations between independent rigid end heads on a supporting element, permanently securing said compacted laminations in position between said end heads to form therewith a unitary device, machining turned surfaces on said end heads while the same are held in position on said supporting element, and removing the assembled laminations and end heads as a unit from said supporting element.

4. A method of manufacturing a dynamo-electric machine member including a group of core laminations held between independent rigid end heads, which comprises assembling the core laminations on a supporting element, finally securing said laminæ in compacted condition between the end heads by means directly associated with said laminæ and end heads and independent of said supporting element, and machining said member while the latter is held by said supporting element.

5. A method of manufacturing a dynamo-electric machine including a group of laminations held between independent rigid end heads, which comprises assembling and compacting the core laminæ on a supporting element, permanently securing said laminæ between the end heads with the latter in predetermined spaced relation by means directly associated with said laminæ and said end heads and independent of said supporting element, and machining said end heads while the member is carried by said supporting element.

6. A method of manufacturing a stator member of a dynamo-electric machine including a laminated core held between independent rigid end heads, which comprises assembling and compacting the core laminæ on a mandrel and between the end heads with apertures in said laminæ and said end heads in alinement, permanently securing said laminæ and end heads as an assembled unit by bolts passing through the alined apertures in said laminæ and said end heads, machining turned surfaces on said end heads while said laminæ and end heads are held in centered position by said mandrel, and removing said assembled member from said mandrel.

7. A method of manufacturing a core of a dynamo-electric machine, which comprises assembling core laminations on a supporting element, compacting said laminations between independent rigid end heads, permanently securing said compacted laminations in position between said end heads by means independent of the devices for compacting the laminations to form said laminations and said end heads into a unitary member, machining a portion of said member while the latter is carried by said supporting element, and removing said member as a unit from said supporting element.

8. A method of manufacturing a dynamo-electric machine including a group of laminæ held between independent rigid end heads, which comprises assembling and compacting core laminæ on a mandrel, permanently securing said laminæ between the end heads by means independent of said mandrel and with the end heads in predetermined spaced relation, and machining said end heads while the member is carried by said mandrel.

In testimony whereof, the signature of the inventor is affixed hereto.

EARLE R. KNIGHT.